US 6,697,047 B2

(12) United States Patent
Agata

(10) Patent No.: US 6,697,047 B2
(45) Date of Patent: *Feb. 24, 2004

(54) INFORMATION PROCESSING APPARATUS

(75) Inventor: Kenichi Agata, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,901

(22) Filed: Jun. 28, 1999

(65) Prior Publication Data

US 2002/0093482 A1 Jul. 18, 2002

(30) Foreign Application Priority Data

Jun. 30, 1998 (JP) .......................................... 10-183730

(51) Int. Cl.[7] .............................. G09G 5/08; G09G 5/00
(52) U.S. Cl. ........................ 345/161; 345/156; 345/168
(58) Field of Search ................................ 345/161, 168, 345/156–157, 160; D14/412, 416; 463/37–38

(56) References Cited

U.S. PATENT DOCUMENTS

| 4,492,830 A | * | 1/1985 | Kim ............................ 200/6 A |
| 5,640,178 A | | 6/1997 | Endo et al. |
| 5,754,167 A | * | 5/1998 | Narusawa et al. ........... 345/161 |
| 5,835,977 A | | 11/1998 | Kamentser et al. |
| 5,867,808 A | * | 2/1999 | Selker et al. .................. 702/41 |
| 5,889,507 A | * | 3/1999 | Engle et al. ................. 345/161 |
| 6,040,823 A | * | 3/2000 | Seffernick et al. ........... 345/168 |
| 6,570,556 B1 | * | 5/2003 | Liao et al. ................... 345/161 |

* cited by examiner

*Primary Examiner*—Richard Hjerpe
*Assistant Examiner*—Duc Q Dinh
(74) *Attorney, Agent, or Firm*—Frommer Lawrence & Haug LLP; William S. Frommer; Matthew K. Ryan

(57) ABSTRACT

An information processing apparatus comprising: a keyboard for inputting signals; a display part for displaying the signals input through the keyboard; and a pointing member attached to the keyboard and having a board, a strain gage and a post. The strain gage is furnished on the board. The post is erected at a center of the board to transmit strain to the strain gage. The post is further displaced so as to move a cursor on the display part. The board is attached fixedly to a back of the keyboard by means of screws. The post is inserted through a hole in the keyboard so as to protrude from a face of the keyboard.

2 Claims, 11 Drawing Sheets

INFORMATION PROCESSING APPARATUS

BACKGROUND OF THE INVENTION

The present invention relates generally to an information processing apparatus such as a portable computer. More particularly, the invention relates to a structure for attaching to such a computer a pointing member (called the pointing device hereunder) that incorporates a strain gage to move a displayed cursor on a display part.

Today, portable information processing apparatuses are gaining widespread use. Of these apparatuses, portable computers illustratively comprise a body and a display part each. The display part is attached swingingly to the body. The face of the body comprises a keyboard used to input characters, symbols, etc. An LCD for displaying images entered through the keyboard is attached to the display part. The keyboard is equipped with a pointing device incorporating a strain gage, the pointing device being used to move a displayed cursor on the display part.

FIG. 13 shows a conventional structure for attaching a pointing device 101 to a keyboard 4. Illustratively, the pointing device 101 has a cross-shaped strain gage 103 formed by thick-film technology on a rectangular PC board 102. A rectangular prism post 104 is erected perpendicularly at the center of the strain gage 103.

The pointing device 101 is fitted to the keyboard 4 as follows: the post 104 is first inserted into a through-hole 4a formed approximately in the middle of the keyboard 4. The board 102 is placed snugly onto the back of the keyboard 4. With the board 102 pushed against the back of the keyboard 4 using a holding plate 105, the holding plate 105 is fastened to the keyboard 4 by means of four screws 106. More specifically, the screws 106 are placed into holes 105a formed near the four corners of the holding pate 105. The screws 106 are then screwed into blind tapped holes, not shown, in the back of the keyboard 4.

Four attaching holes 4b are formed in the keyboard 4, as shown in FIG. 14. The four screws 106, inserted into the attaching holes 4b, are screwed into the holes 105b near the four corners of the holding plate 105.

In the conventional pointing device attaching structure outlined above, the holding plate 105 is needed in order to fasten the board 102 onto the back of the keyboard 4. The structure is thus bound to increase the number of components as well as the number of assembling steps, thus incurring cost increases. Pushing the pointing device 101 against the back of the keyboard 4 by means of the holding plate 105 generates strain and can lead to malfunctions.

SUMMARY OF THE INVENTION

It is therefore an object of the present invention to provide an information processing apparatus allowing a pointing device to be installed in an inexpensive manner while forestalling possible malfunctions stemming from the mounting of that pointing device.

In carrying out the invention and according to one aspect thereof, there is provided an information processing apparatus comprising: a keyboard for inputting signals; a display part for displaying the signals input through the keyboard; and a pointing member attached to the keyboard and having a board, a strain gage and a post, the strain gage being furnished on the board, the post being erected at a center of the board to transmit strain to the strain gage, the post being further displaced so as to move a cursor on the display part; wherein the board is attached fixedly to a back of the keyboard by means of fastening members; and wherein the post is inserted through a hole in the keyboard so as to protrude from a face of the keyboard.

In a preferred structure according to the invention, the board may be secured at three points near a periphery of the board.

In another preferred structure according to the invention, the information processing apparatus may further comprise positioning pins.

Other objects, features and advantages of the invention will become more apparent upon a reading of the following description and appended claims.

DESCRIPTION OF THE PREFERRED EMBODIMENT

A preferred embodiment of this invention is described below. The means claimed as constituting the invention will be described below using specific examples in parentheses where appropriate. However, such specifics are only for illustration purposes and are not limitative of the invention.

Figure 8:
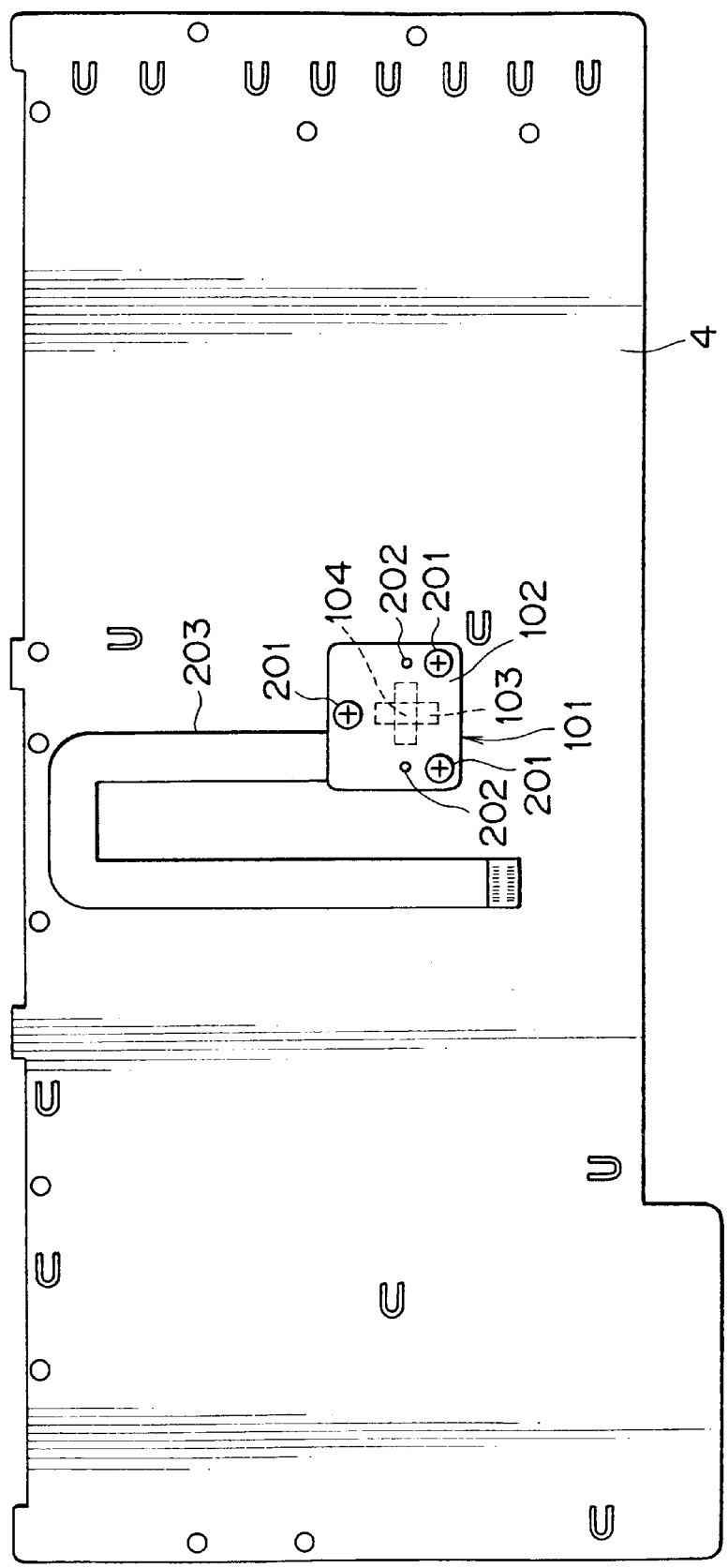
FIG. 8 is a bottom view with a pointing device attached to a back of a keyboard included in FIG. 1.

In an information processing apparatus embodying the invention, three points of a board (e.g., board 102 in FIG. 8) near its periphery are fastened to a back of a keyboard (e.g., keyboard 4 in FIG. 8) by means of fastening members (e.g., screws 201 in FIG. 8). A post (e.g., post 104 in FIG. 8) is inserted through a hole in the keyboard (e.g., hole 4a in FIG. 9) so as to protrude from a face of the keyboard.

The embodiment of this invention will now be described with reference to the accompanying drawings.

Figure 1:
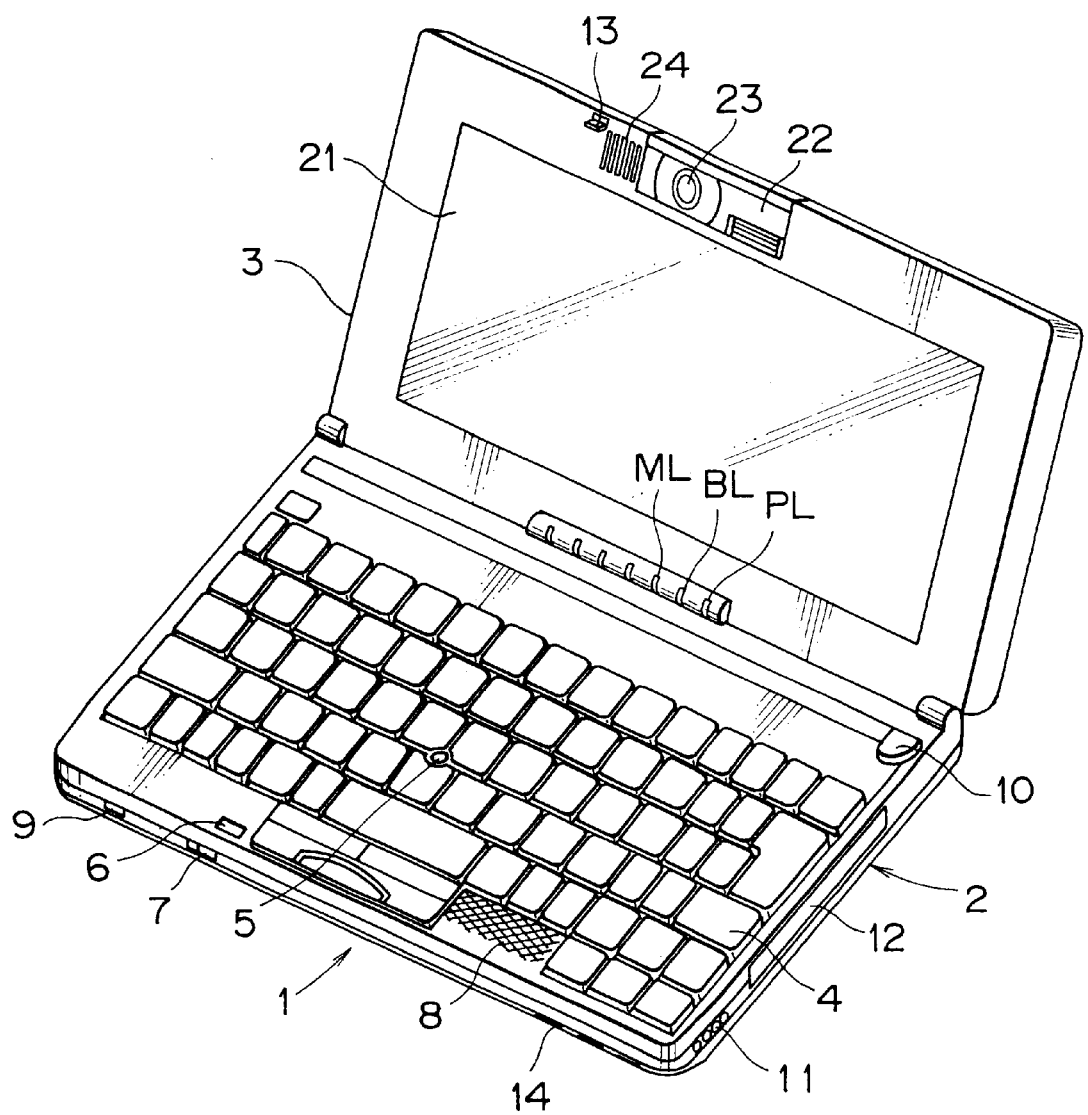
FIG. 1 is a perspective view of a portable personal computer embodying the invention, with its display part swung open away from its body.
Figure 2:
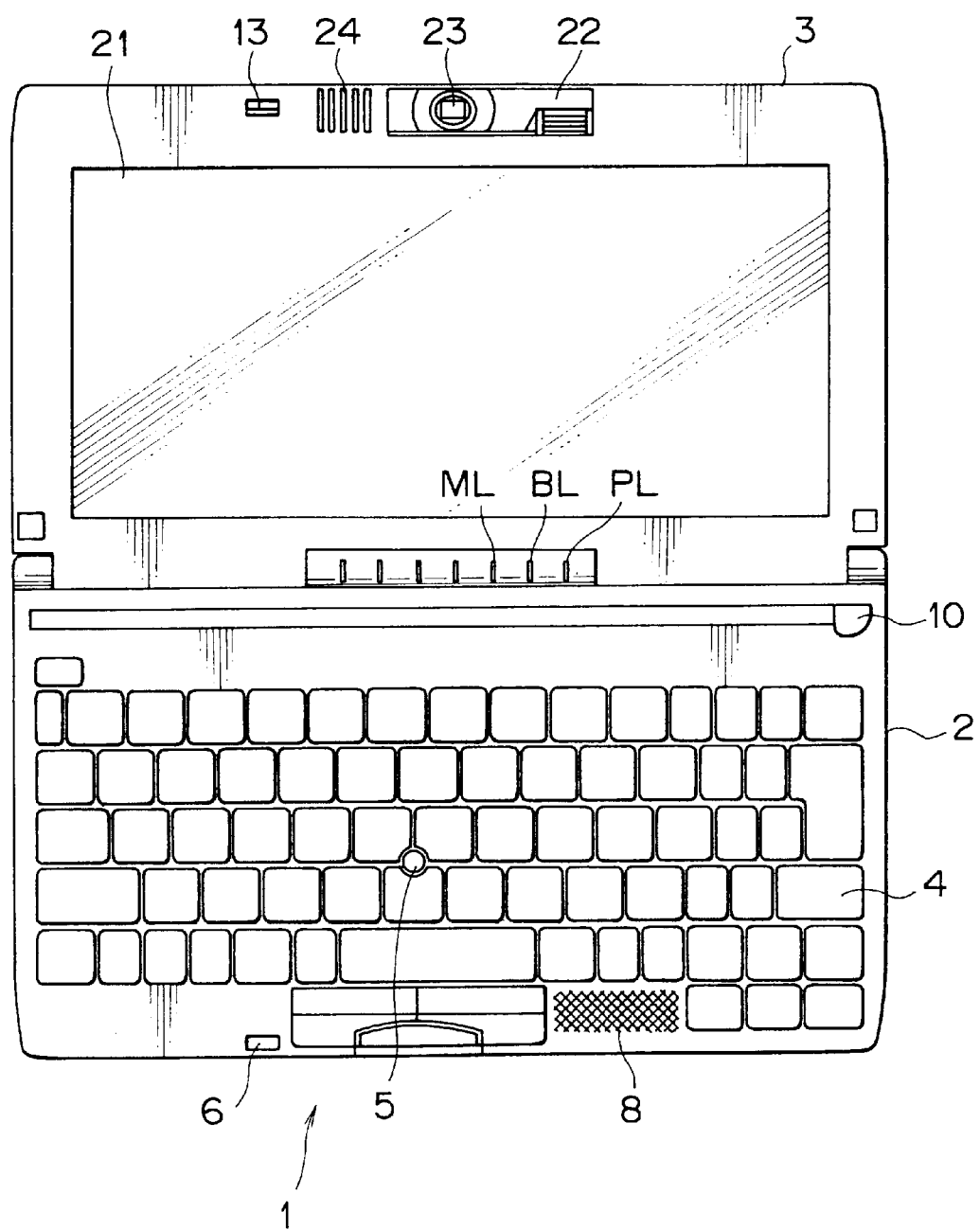
FIG. 2 is a plan view of the computer in FIG. 1.
Figure 3:
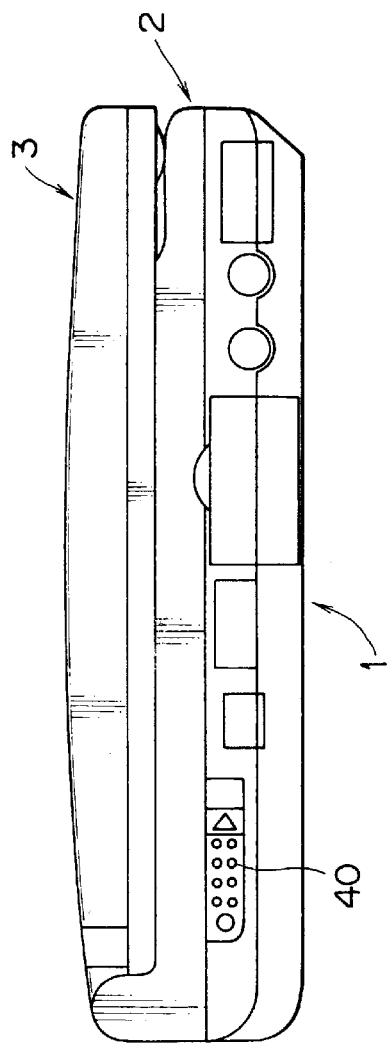
FIG. 3 is a left-hand side view of the computer in FIG. 1 with its display part swung shut onto its body.
Figure 4:
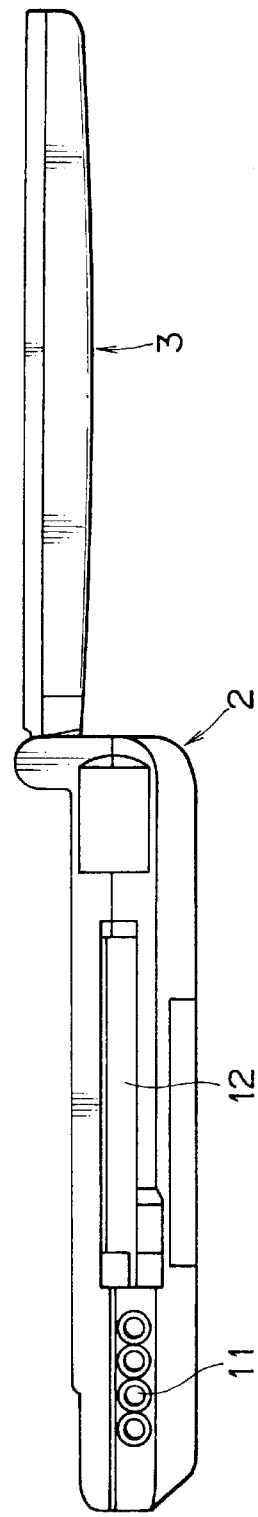
FIG. 4 is a right-hand side view of the computer in FIG. 1 with its display part swung open 180 degrees relative to its body.
Figure 5:
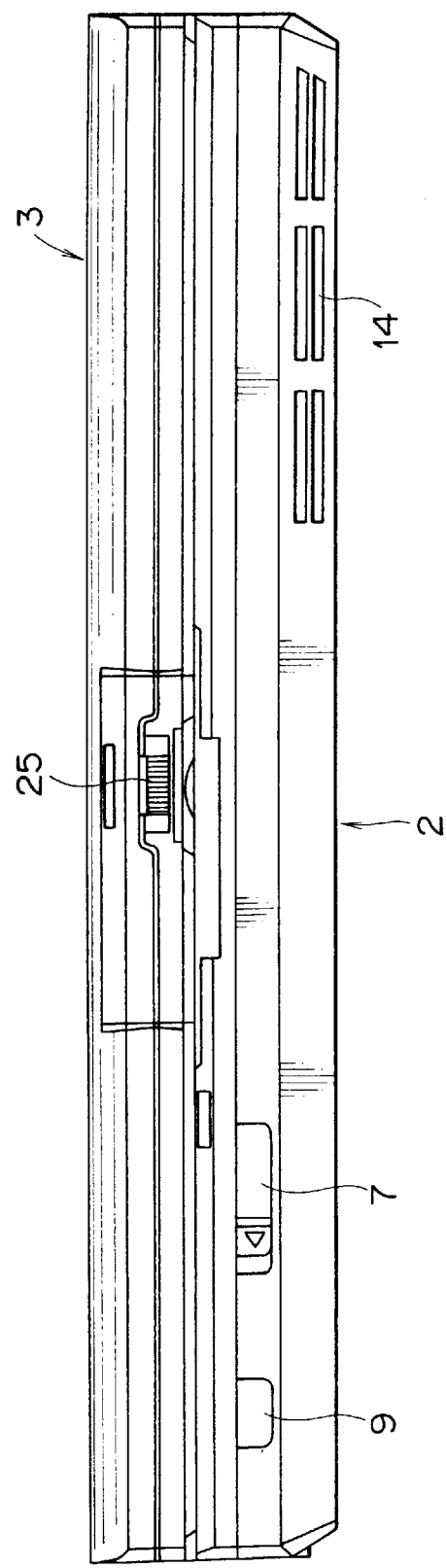
FIG. 5 is a front view of the computer in FIG. 3.
Figure 6:
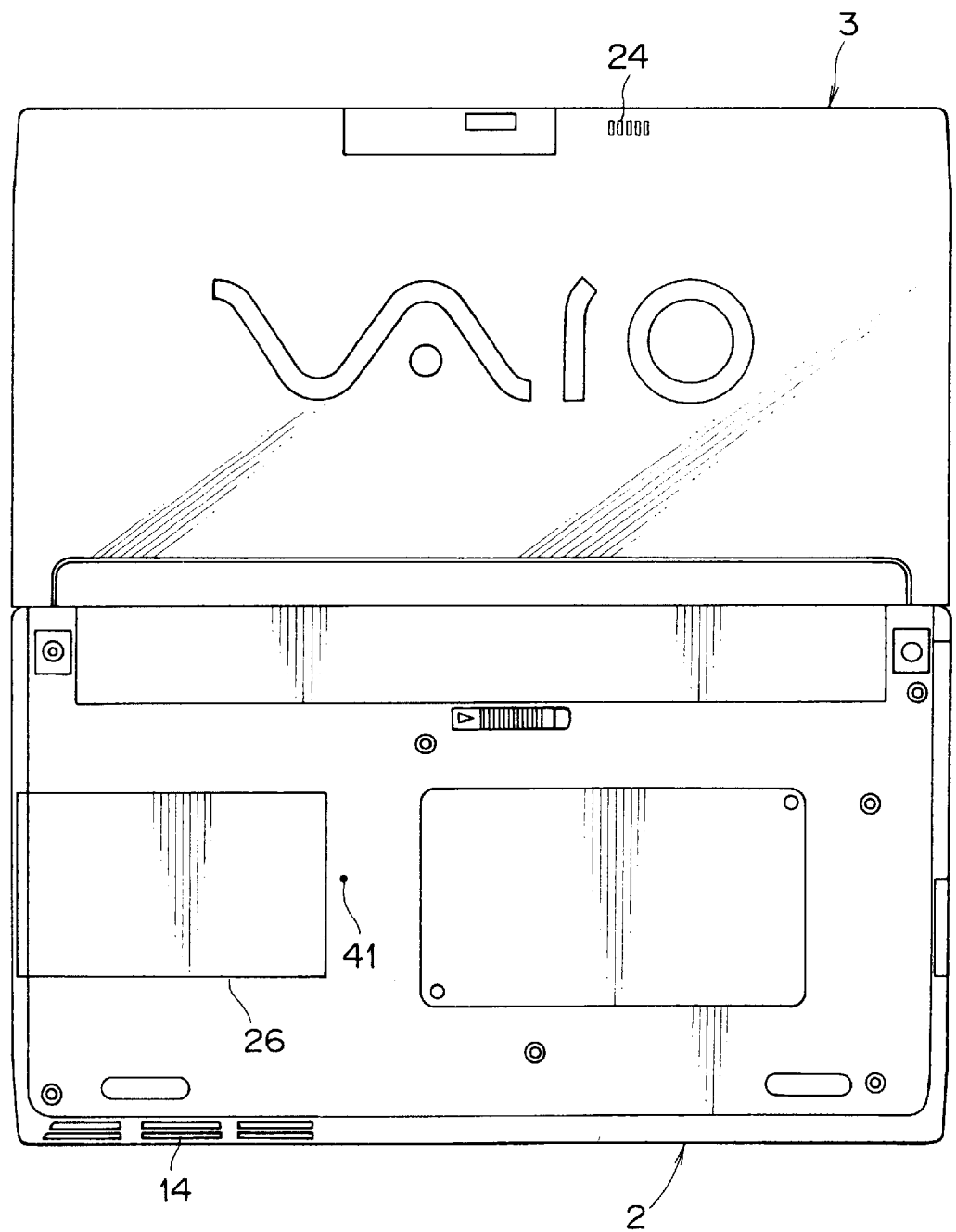
FIG. 6 is a bottom view of the computer in FIG. 4.

FIGS. 1 through 6 depict a typical portable personal computer 1 to which the invention is applied. The personal computer 1 is a mini-notebook type personal computer that primarily comprises a body 2 and a display part 3 attached swingingly to the body 2. FIG. 1 is a perspective view of the computer with the display part 3 swung open away from the body 2. FIG. 2 is a plan view of the computer in FIG. 1. FIG. 3 is a left-hand side view of the computer with the display part 3 swung shut onto the body 2. FIG. 4 is a right-hand side view of the computer with the display part 3 swung open 180 degrees relative to the body 2. FIG. 5 is a front view of the computer in FIG. 3. FIG. 6 is a bottom view of the computer in FIG. 4.

The face of the body 2 comprises a keyboard 4 and a track point (registered trademark) 5. The keyboard 4 is used to input characters, symbols, etc., and the track point 5 is operated to move a mouse cursor. Also furnished on the body face is a speaker 8 for sound output along with a shutter button 10 operated to take a picture using a CCD video camera 23 mounted on the display part 3.

A pawl 13 is provided at the upper end of the display part 3. As shown in FIG. 3, with the display part 3 swung closed onto the body 2, the pawl 13 hooks on to a hole 6 in the body 2. At the front of the body 2 is a slide lever 7 furnished in a crosswise movable fashion. The slide lever 7 is used to lock and unlock the pawl 13 so that the pawl 13 is engaged with and disengaged from the hole 6. With the pawl 13 unlocked, the display part 3 may be swung open away from the body 2. Adjacent to the pawl 13 is a microphone 24 which, as depicted in FIG. 6, may pick up sound from both the front and the back side of the body 2.

The front of the body 2 further comprises a programmable power key (PPK) 9. An air outlet 11 is provided on the right-hand side of the body 2, as shown in FIG. 4. At the lower end in front of the body 2 is an air inlet 14 as depicted in FIG. 5. To the right of the air outlet 11 is a slot 12 that accommodates a PCMCIA (Personal Computer Memory Card International Association) card (called a PC card).

An LCD (liquid crystal display) 21 for displaying images is provided on the front of the display part 3. At the upper end of the LCD 21 is an image pickup part 22 mounted rotatably on the display part 3. More specifically, the image pickup part 22 is rotatable to any position within a range of 180 degrees in the same direction as the LCD 21 and in the opposite direction thereof (i.e., toward the back). The image pickup part 22 is furnished with the CCD video camera 23.

At the lower end of the display part 3 on the body side is a group of lamps including a power lamp PL, a battery lamp BL, a message lamp ML and other LEDs. Reference numeral 40 in FIG. 3 denotes a power switch furnished on the left-hand side of the body 2, and reference numeral 25 in FIG. 5 represents an adjusting ring used to adjust the focus of the CCD video camera 23. Reference numeral 26 in FIG. 6 stands for a cover that conceals an opening through which to install an additional memory into the body 2, and reference numeral 41 denotes a hole through which to insert a pin to unlock the cover 26.

Figure 7:
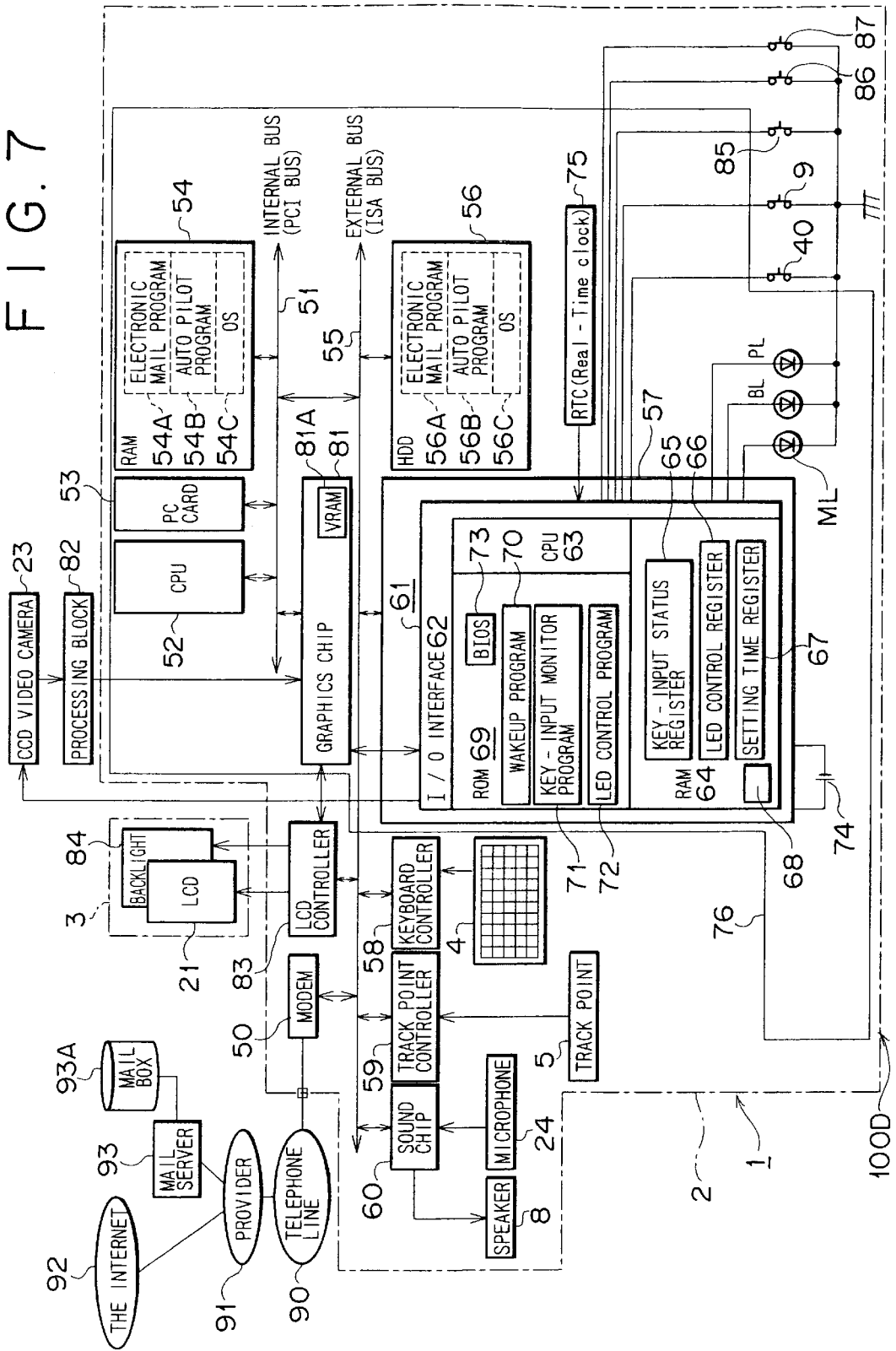
FIG. 7 is a block diagram outlining electrical circuits of the computer in FIG. 1.

FIG. 7 illustrates an internal structure of the personal computer 1. As shown in FIG. 7, an internal bus 51 is connected to a CPU (central processing unit) 52, a PC card 53 inserted as needed, a RAM (random access memory) 54, and a graphic chip 81. The internal bus 51 is coupled to an external bus 55. The external bus 55, for its part, is connected to a hard disk drive (HDD) 56, an I/O (input/output) controller 57, a keyboard controller 58, a track point controller 59, a sound chip 60, an LCD controller 83, and a modem 50.

The CPU 52 is a controller that controls diverse computer functions. The PC card 53 is installed as needed when an optional function is to be added.

When the personal computer 1 is booted up, an electronic mail program (an application program) 54A, an auto pilot program (another application program) 54B and the OS (operating program) 54C are transferred from the HDD 56 to the RAM 54 and retained therein.

The electronic mail program 54A is a program that exchanges communication messages with an external entity using a communication line such as a telephone line and by way of a network. A received mail acquisition function is specifically included in the electronic mail program 54A. The received mail acquisition function checks a mail server 93 to see if a mail box 93A therein contains any mail addressed to this program (i.e., to the user). If any such mail is found in the mail box 93A, the received mail acquisition function carries out a suitable process to acquire that mail.

The auto pilot program 54B is a program that starts up and carries out a plurality of predetermined processes (or programs) in a predetermined sequence.

The OS (operating system) 54C controls basic computer functions. A typical operating system is Windows 95 (registered trademark).

The hard disk drive (HDD) 56 connected to the external bus 55 contains the electronic mail program 56A, auto pilot program 56B, and OS (operating system) 56C. During the booting process, the OS 56C, auto pilot program 56B and electronic mail program 56A are transferred successively from the hard disk drive 56 to the RAM 54 and stored in the memory.

The I/O controller 57 has a microcontroller 61 equipped with an I/O interface 62. The microcontroller 61 is constituted by the I/O interface 62, a CPU 63, a RAM 64 and a ROM 69 which are interconnected. The RAM 64 includes a key input status register 65, an LED (light-emitting diode) control register 66, a set time register 67, and a register 68. The set time register 67 is used to start the operation of a start sequence controller 76 when a time preset by the user (i.e., starting condition) is reached. The register 68 holds a correspondence between a preset combination of operation keys (starting condition) on the one hand and an application program to be started on the other hand. When the user inputs the preset combination of operation keys, the corresponding application program (e.g., electronic mail program) is started.

When the fingertip-operated programmable power key (PPK) 9 is pushed, the key input status register 65 gets and retains an operation key flag. The LED control register 66 is used to control the illumination of the message lamp ML indicating that boot-up status of an application program (e.g., electronic mail program) which is held in the register 68. A desired time of day may be set to the set time register 67.

The microcontroller 61 is connected to a backup battery 74. The battery 74 allows contents of the registers 65, 66 and 67 to be retained when power to the body 2 is turned off.

The ROM 69 in the microcontroller 61 contains in advance a wake-up program 70, a key input monitoring program 71, and an LED control program 72. The ROM 69 is illustratively composed of an EEPROM (electrically erasable and programmable read only memory). The EEPROM is also called a flash memory. The microcontroller 61 is connected to an RTC (real-time clock) 75 that keeps the current time.

The wake-up program 70 in the ROM 69 is a program that checks to see if a preset time in the set time register 67 is reached on the basis of time-of-day data from the RTC 75. When the preset time is reached, the wake-up program 70 starts up a predetermined process (or program). The key input monitoring program 71 continuously monitors whether the PPK 9 is pushed by the user. The LED control program 72 controls the lighting of the message lamp ML.

Furthermore, the ROM 69 contains a BIOS (basic input/output system) 73. The BIOS is a software program that controls exchanges of data (input and output) between the OS or application software on the one hand and peripheral devices (e.g., display part, keyboard, hard disk drive) on the other hand.

The keyboard controller 58 connected to the external bus 55 controls input from the keyboard 4. The track point controller 59 controls input from the track point 5.

The sound chip 60 receives input from the microphone 24, and supplies sound signals to the built-in speaker 8.

The modem 50 permits connection to a communication network 92 such as the Internet and to the mail server 93 through a public telephone line 90 and an Internet service provider 91.

Image data captured by the CCD video camera 23 are forwarded to a processing part 82 for processing. The image data processed by the processing part 82 are input to the graphic chip 81 connected to the internal bus 51. The graphic chip 81 stores the input video data into an internal VRAM 81A, and retrieves the data from the memory as needed for output to the LCD controller 83. Given the image data from the graphic chip 81, the LCD controller 83 outputs the data to the LCD 21 for display. Back lights 84 are provided to illuminate the LCD 21 from the back.

The power switch 40 is operated to turn on and off the power supply. A half-push switch 85 is activated when the shutter button 10 is half-pushed. A full-push switch 86 is turned on when the shutter button 10 is fully pushed. A reverse switch 87 is turned on when the image pickup part 22 is rotated by 180 degrees (i.e., when the CCD video camera 23 is rotated into a direction suitable for picking up an image on the opposite side of the LCD 21).

Figure 13:
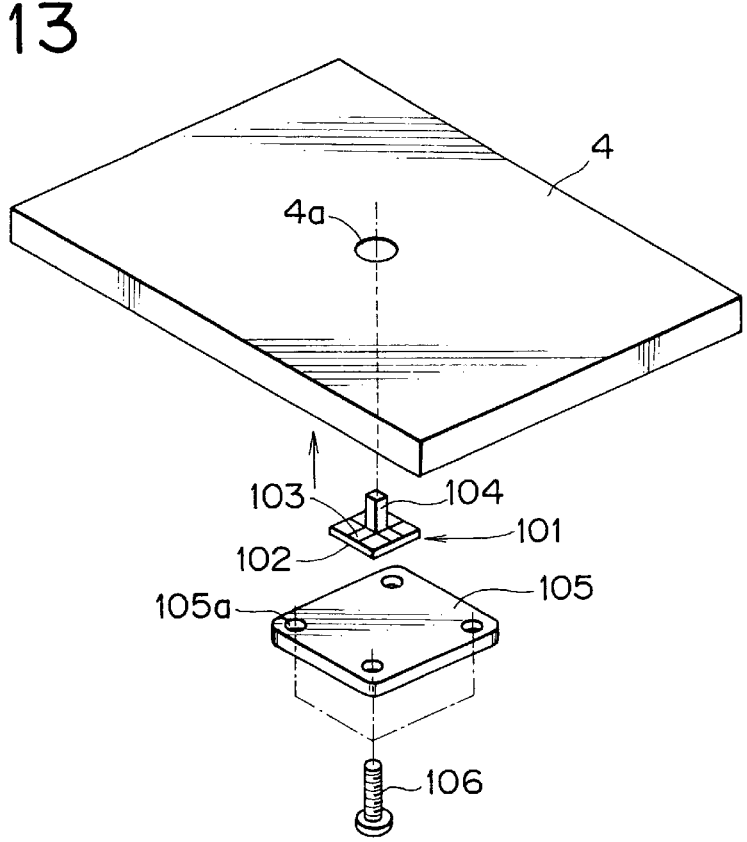
FIG. 13 is an exploded view of a typical setup in which a pointing device is attached conventionally to a keyboard.
Figure 14:
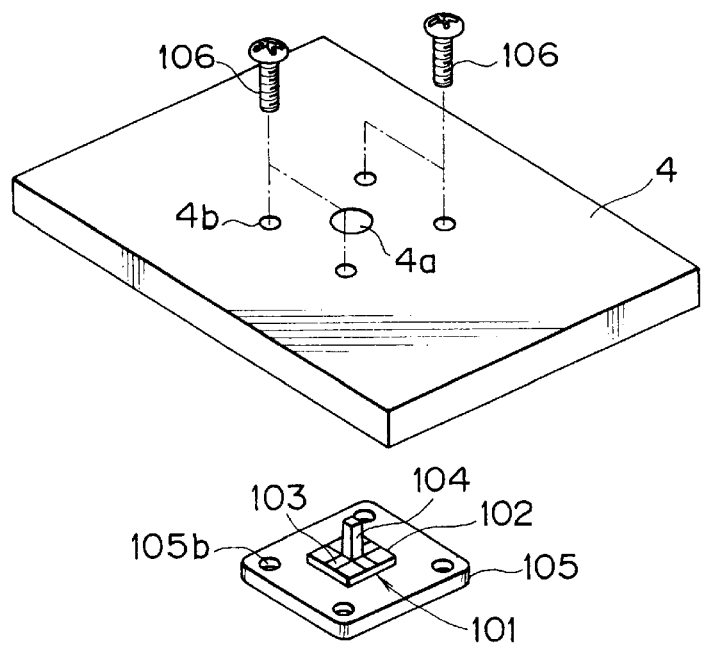
FIG. 14 is an exploded view of another typical setup in which a pointing device is attached conventionally to a keyboard.

FIGS. 8 through 12 depict an inventive structure for attaching a pointing device to a keyboard. In these figures, the components with their corresponding parts already shown in FIGS. 13 and 14 are given the same reference numerals, and their descriptions are omitted below where appropriate.

Figure 9:
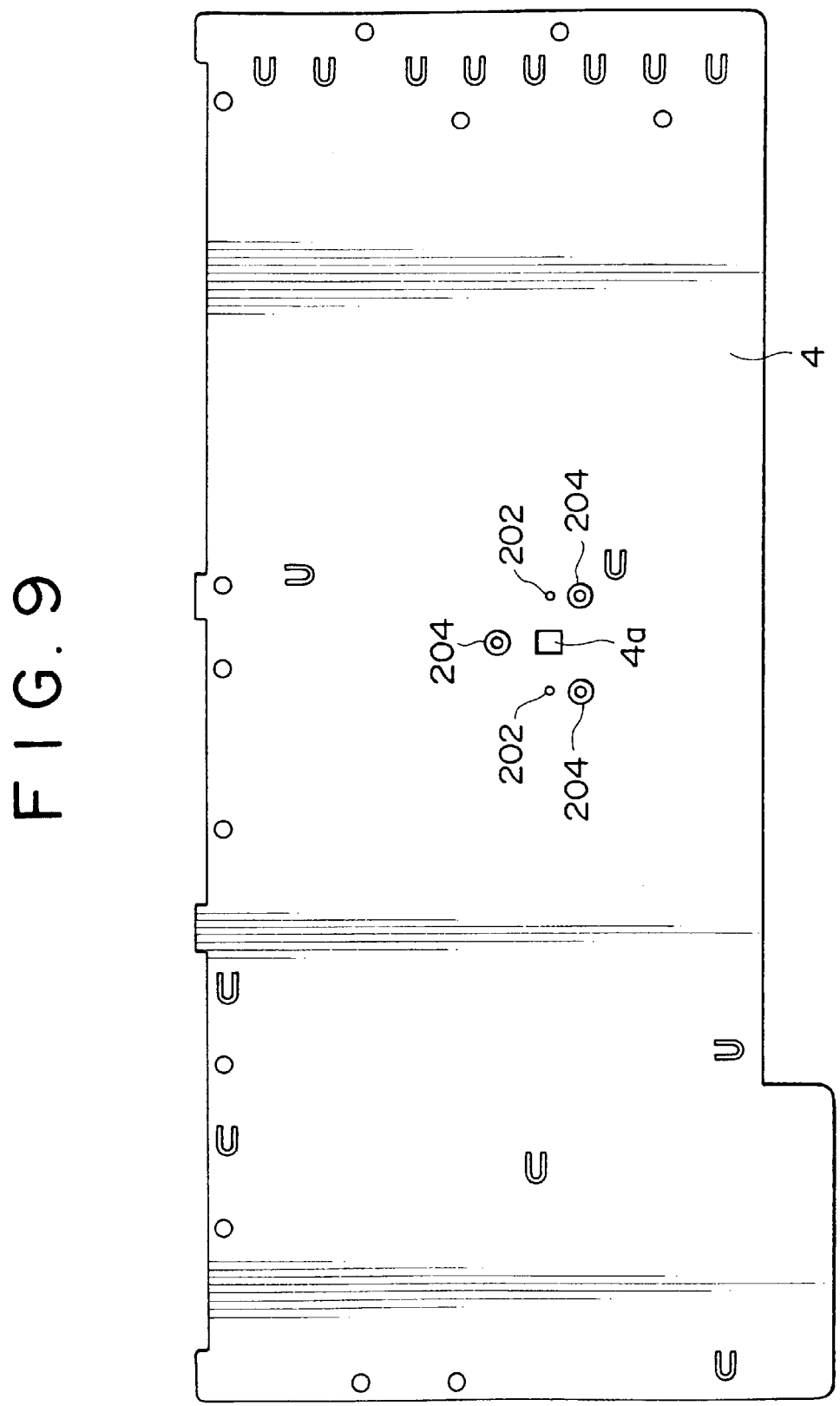
FIG. 9 is a bottom view with the pointing device of FIG. 8 removed.

FIG. 8 is a bottom view with a pointing device 101 attached to a back of the keyboard 4, and FIG. 9 is a bottom view with the pointing device 101 removed. In FIG. 8, three through-holes are formed in a board 102 near its periphery. Screws 201 are inserted into the holes as fastening members. Also near the periphery of the board 102 are two positioning pin holes 205 each having a positioning pin 202 inserted thereinto. A cable 203 coming from the pointing device 101 is connected to a controller, not shown. Displacements of a post 104 detected by the pointing device 101 are transmitted through the cable 203 to the controller.

Figure 10:
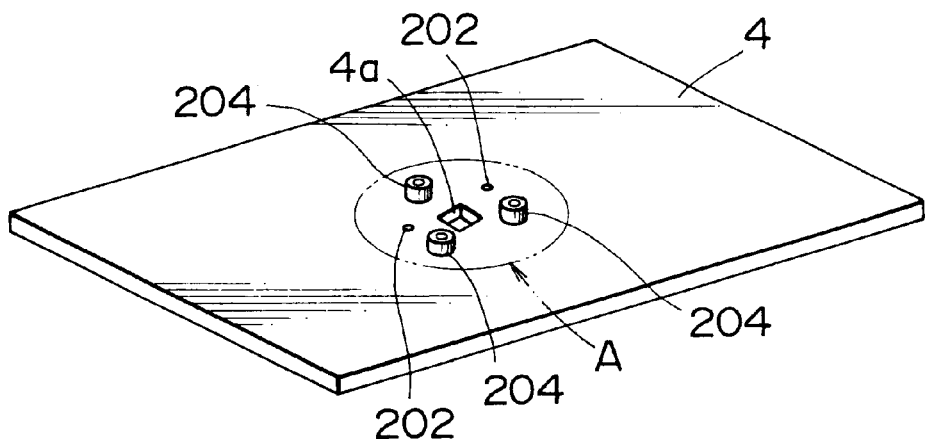
FIG. 10 is a perspective view of the setup in FIG. 9.
Figure 11:
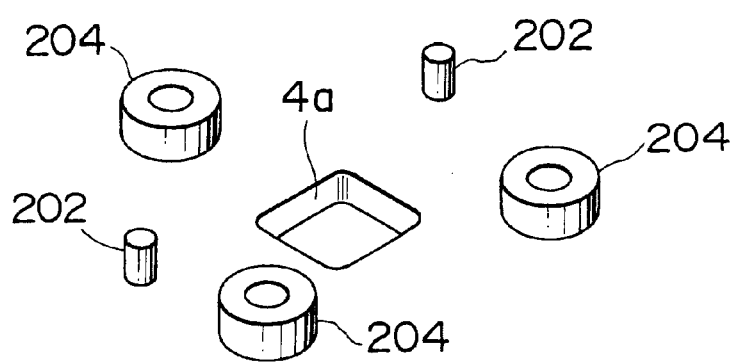
FIG. 11 is an enlarged view of a portion A in FIG. 10.

In FIG. 9, a hole 4a is formed approximately in the middle of the keyboard 4. The post 104 of the pointing device 101 is inserted into the hole 4a. A tip of the post 104 constitutes the track point 5 shown in FIG. 1. Around the hole 4a are attaching boss holes 204 formed in locations corresponding to the three through-holes in the board 102 of FIG. 8. Likewise, positioning pins 202 are erected in locations corresponding to the positioning pin holes 205. FIG. 10 is a perspective view of the back of the keyboard in FIG. 9, and FIG. 11 is an enlarged view of a portion A in FIG. 10.

Figure 12:
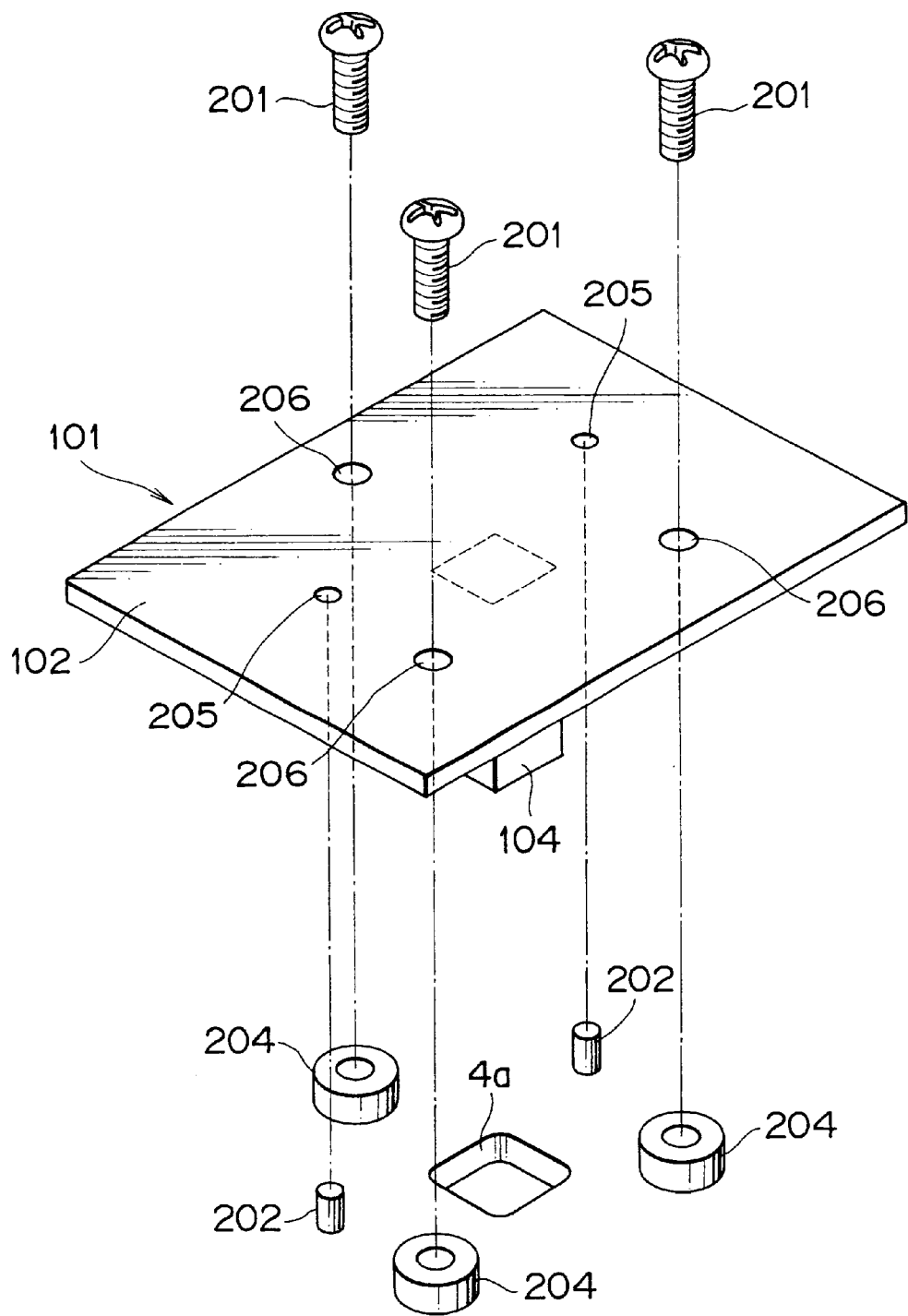
FIG. 12 is an exploded view illustrating how the pointing device of FIG. 8 is attached to the keyboard.

FIG. 12 is an exploded view illustrating how the pointing device 101 is attached to the back of the keyboard 4, as viewed from the back. The post 104 of the pointing device 101 is inserted into the hole 4a in the keyboard 4. The positioning pins 202 are inserted into the pin holes 205 for positioning. Three screws 201 are inserted into the through-holes 206 in the board 102 and are screwed into the attaching boss holes 204 of the keyboard 4. Driving in the screws 201 fastens the pointing device 101 securely to the back of the keyboard 4.

To move a cursor, not shown, on the LCD 21 in FIG. 1, the user pushes the post 104 in any of two perpendicularly intersecting directions of the cross-shaped strain gage 103 formed on the board 102. The pushing action causes the strain gage 103 to generate currents that are sent over the cable 203 to the controller, not shown. Given the currents, the controller moves the displayed cursor in any of the two directions accordingly.

Unlike conventional setups, the embodiment of the invention described above has no need to use the holding plate 105 to fasten the pointing device 101 onto the keyboard 4. The embodiment reduces the number of components and that of assembling steps and thus lowers costs. Because the board 102 is screwed to the keyboard 4 at three points, the strain conventionally experienced in installing a point device is prevented. This eliminates the possibility of strain-incurred malfunctions.

In the information processing apparatus according to the invention, as described, the board of the pointing member for cursor movement on the display part is fastened at three points to the back of the keyboard by means of fastening members. The inventive structure reduces the number of components and that of assembling steps and thus lowers the costs involved. This in turn reduces the incidence of malfunctions.

While a preferred embodiment of the invention has been described using specific terms, such description is for illustrative purposes only, and it is to be understood that changes and variations many be made without departing from the spirit or scope of the claims that follow.

What is claimed is:

1. An information processing apparatus comprising:

a keyboard for inputting signals;

a display part for displaying said signals input through said keyboard; and a pointing member attached to said keyboard and having a board, a strain gauge and a post, said strain gauge being formed on said board, said post being integrally formed at a center of said board to transmit strain to said strain gauge, said post being inserted through a hole in said keyboard so as to protrude from a face of said keyboard so that said post is displaceable so as to move a cursor on said display part; and means for fastening said board to a back of said keyboard, said fastening means includes first and second corresponding sets of fastening members in said board of said pointing member and said keyboard, said first set of fastening members include at least one but not more than two positioning pins formed in said keyboard which are engaged in pin holes formed in said board of said pointing member, said second set of fastening members include three fasteners which extend through through-holes of said board which are matingly engaged with boss holes of said keyboard whereby both of said positioning pins and said fasteners extend through said board of said pointing member but in opposite directions so that said second set of fastening members provides means for assuring proper alignment and engagement of said positioning pins in said pin holes of said first set of fastening members.

2. An information processing apparatus according to claim 1, wherein said board is secured at three points near a periphery of said board.

* * * * *